United States Patent [19]

Fusco

[11] 4,288,784
[45] Sep. 8, 1981

[54] LIGHT AND ALARM DEVICE

[76] Inventor: Andrew Fusco, 52 Winchester, Youngstown, Ohio 44509

[21] Appl. No.: 89,997

[22] Filed: Oct. 31, 1979

[51] Int. Cl.³ .............................. G08B 1/08; G08B 7/00
[52] U.S. Cl. ...................................... 340/326; 340/50; 340/539; 340/331; 362/35; 250/201
[58] Field of Search ................................ 340/326-329, 340/331, 332, 539, 50, 84, 87, 90; 116/3, 4; 250/200, 201; 362/35, 170

[56] References Cited

U.S. PATENT DOCUMENTS

| | | | |
|---|---|---|---|
| 2,674,726 | 4/1954 | Williams | 340/331 |
| 3,544,987 | 12/1970 | McMann et al. | 340/327 |
| 3,599,201 | 8/1971 | Clardy | 340/326 |
| 3,789,358 | 1/1974 | Ellis | 340/50 |
| 3,863,236 | 1/1975 | Clardy | 340/326 |

*Primary Examiner*—John W. Caldwell, Sr.
*Assistant Examiner*—Donnie Lee Crosland
*Attorney, Agent, or Firm*—Webster B. Harpman

[57] ABSTRACT

In an audio visual alarm device that can be mounted on a wall or a post an enclosure with an automatic dusk to dawn security light, a selectively energizable rotating signal light and an audible electrically actuated siren. A remotely controlled relay energizes the alarm and a circuit arranged to extinguish the security light upon actuation of the alarm.

4 Claims, 3 Drawing Figures

U.S. Patent  Sep. 8, 1981  4,288,784
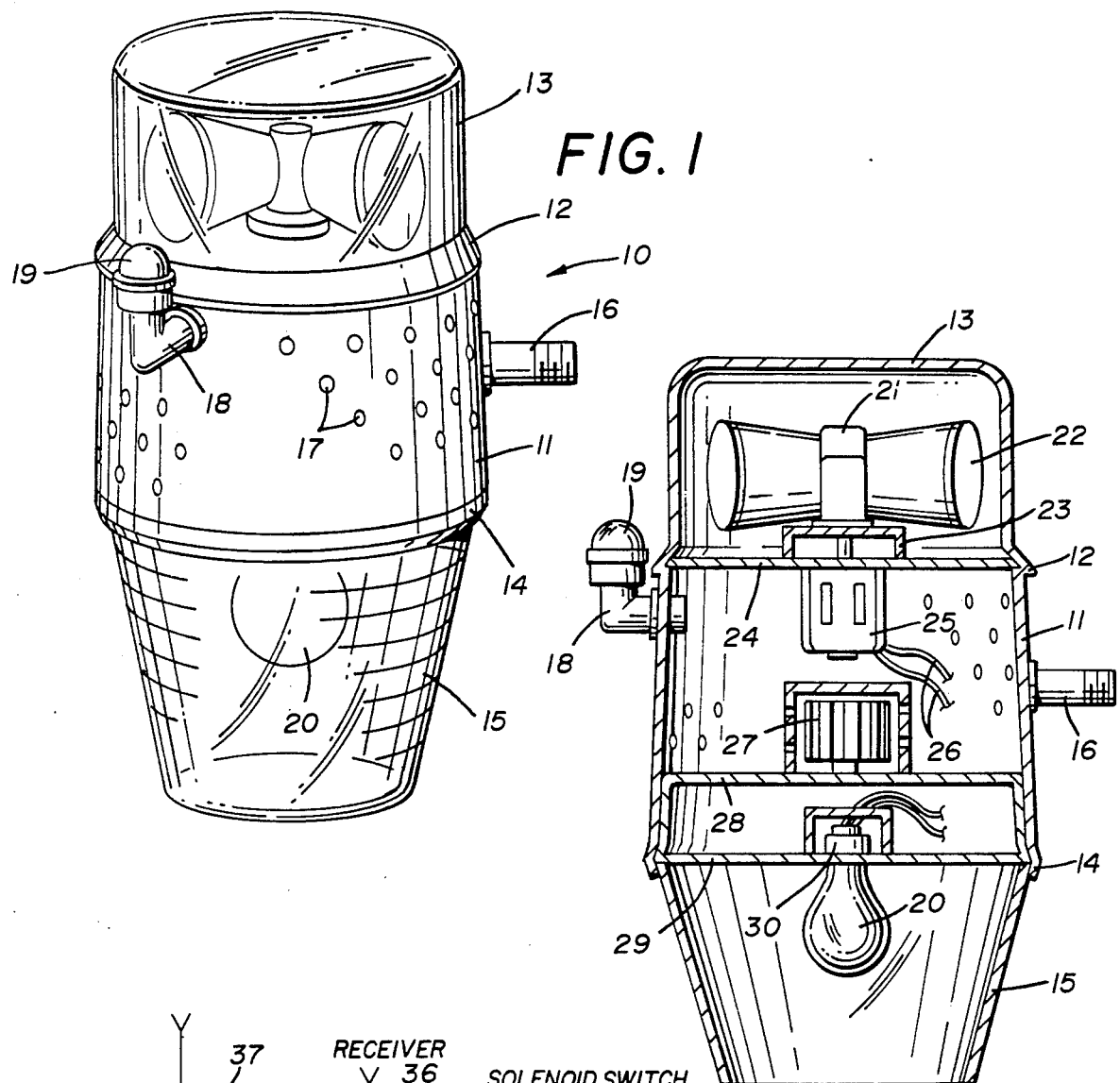
FIG. 1
FIG. 2
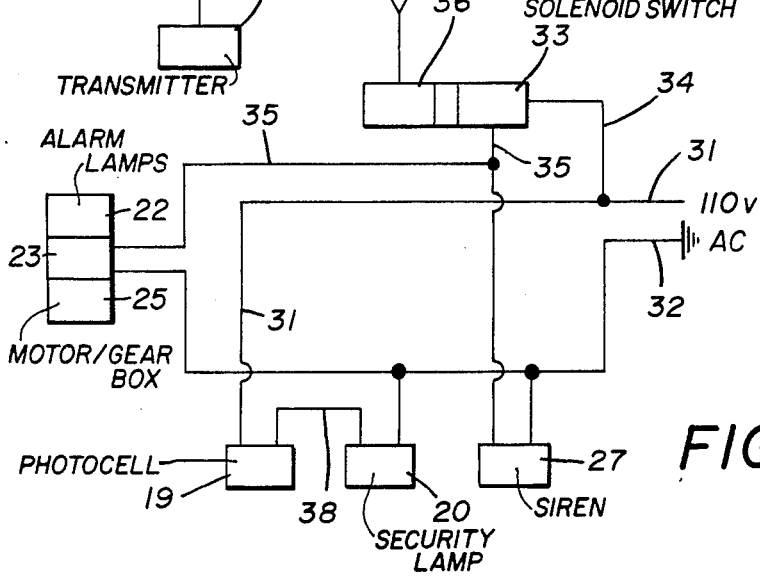
FIG. 3

LIGHT AND ALARM DEVICE

BACKGROUND OF THE INVENTION (1) Field of the Invention

This device relates to emergency alarms utilizing audio visual signals to alert others to an emergency situation.

(2) Description of the Prior Art

Prior devices have used a variety of light and audio signalling means. See for example U.S. Pat. Nos. 3,599,201 and 3,863,236.

In U.S. Pat. No. 3,599,201 a light source on an ornamental post is disclosed, the light source incorporating a lighting lamp and a photocell switch. A second light source is also provided in the form of an emergency colored lamp.

Applicants' invention has a conventional mercury vapor security lamp with additional rotatable emergency signalling lights and an audio alarm source arranged so that the actuation of the emergency signalling lamps energizes a photocell which in turn controls the security lamp by de-energizing the same.

U.S. Pat. No. 3,863,236 discloses an alarm having a pair of lamps of similar design with an audio device, all in a decorative enclosure.

Applicants' invention utilizes two distinctively different light systems with only one essential control circuit for the multiple functioning of the security light, the emergency light and the emergency audio alarm.

SUMMARY OF THE INVENTION

A security light and alarm device comprises a normally automatically operated dusk to dawn security light and a rotating emergency flashing pair of lights with an audio alarm energized by a single selective control circuit so that a remote transmitter can actuate the alarm function and deactivate the normal security light upon operation of the alarm signal.

DESCRIPTION OF THE DRAWINGS

FIG. 1 is a perspective view of the light and alarm device;

FIG. 2 is a sectional view of the light and alarm device as seen in FIG. 1; and

FIG. 3 is a diagram of a circuit used in the present invention.

DESCRIPTION OF THE PREFERRED EMBODIMENT

A security light and alarm device comprises an enclosure as seen in FIG. 1 of the drawings and generally indicated by the numeral 10. The enclosure has a cylindrical body 11, the upper end 12 is adapted to receive a transparent dome 13 and the lower end 14 of which is adapted to receive and retain a semi-cylindrical light diffusing lens 15. A tubular support bracket 16 extends from one side of the cylindrical body 11 and provides means for mounting the security light and alarm device on a wall or on a post as will occur to those skilled in the art. A plurality of apertures 17 are provided in the cylindrical body 11 to ventilate the same and a projecting fitting 18 mounts a light actuated photocell 19, which is arranged in a circuit hereinafter described, to control a mercury vapor or other security light source 20.

By referring now to FIG. 2 of the drawings, it will be seen that the transparent dome 13 encloses a rotatable socket assembly 21 in which two or more alarm lamps 22 are mounted. The rotatable socket 21 is mounted on a bearing structure 23 which includes two annular conductors, not shown, arranged for continuous electrical connection with brushes, not shown, which are part of the rotatable socket 21 as will be understood by those skilled in the art.

The bearing structure 23 is positioned on the upper surface of a top wall 24 of the cylindrical housing 11 and a combination motor and gear box 25 is positioned below the top wall 24 and secured thereto with a shaft from the gear box extending upwardly so as to engage the rotatable socket 21 and impart rotating motion thereto. Conductors extend from the motor and gear box 25 so that the motor and the alarm lamps 22 can be energized thereby as hereinafter described.

Still referring to FIG. 2 of the drawings, it will be seen that an electrically actuated audio device, such as a siren 27, is shown within the cylindrical housing 11 and mounted on a partition 28 which is spaced above a bottom wall 29 of the cylindrical housing 11. A secondary socket 30 mounted on the bottom wall 29 provides a receptacle for the mercury vapor or other security light source 20 heretofore referred to.

It will occur to those skilled in the art that several means of controlling the rotating alarm lamps 22 and the siren 27 are possible and a preferred embodiment of a workable circuit is disclosed herein and is illustrated in FIG. 3 of the drawings in which a 110 volt alternating current supply is represented by two conductors 31 and 32 respectively. A solenoid actuated switch 33 is connected by a conductor 34 to the supply conductor 31 and secondary conductors 35 extend therefrom to the bearing structure 23 which by reference incorporates the motor and gear box 25 and the rotating alarm lamps 22.

Another of the secondary conductors 35 extends to the electric motor which actuates the siren 27 and the solenoid switch 33 is in turn arranged to be actuated by a radio signal receiver 36 which may be actuated by a remotely situated radio signal transmitter 37.

The security light 20 is connected to the conductor 31 by way of the photocell 19 and an interconnecting conductor 38.

In operation, it will be seen that the security light 20 is normally automatically energized and de-energized by the operation of the photocell 19 and that the siren 27 and the rotating alarm lamps 22 are energized by the solenoid switch 33 which is responsive in operation to the radio signal receiver 36. Thus the alarm lamps 22 and the siren 27 may be actuated at any time and when the security light 20 is energized it will automatically be de-energized by the light from the alarm lamps 22 actuating the photocell 19 which responds by opening the circuit to the security light 20. Thus in the night time hours when the security light 20 is normally illuminated, the actuation of the solenoid switch 33 by the receiver 36 and its remote transmitter 37 or by a manually operated switch responsive to an emergency will not only start up the rotating alarm lamps 22 for a visual alarm and initiate the operation of the electric motor in the siren 27 for the audible alarm, but will simultaneously and automatically shut off the security light 20 so that the same will not confuse or hide or otherwise interfere with the clear visual impact of the rotating alarm lamps 22. The simplicity of the operation is quite effective and utilizes the highly dependable photocell operation of security lights now generally known. The exterior appearance of the light and alarm device is substantially conventional so that it does not readily indicate that it is an alarm and it continues its normal function as a security light until and unless the alarm signal as hereinbefore explained is transmitted thereto.

Although but one embodiment of the present invention has been illustrated and described, it will be apparent to those skilled in the art that various changes and modifications may be made therein without departing from the spirit of the invention and having thus described our invention what we claim is:

1. A security light and alarm device consisting of a housing having light transmitting extensions on its upper and lower ends, a rotatable socket assembly positioned in the extension on said upper end thereof, at least one alarm lamp mounted in said rotatable socket assembly, a power source, a circuit in connection with said power source and said rotatable socket assembly for energizing said rotatable socket assembly and alarm lamp and means for imparting rotary movement to said rotatable socket assembly, a security light located in said light transmitting extension on the lower end of said housing, a circuit in connection with said power source and said security light, a photocell positioned exteriorly of said housing and arranged to receive light from said alarm lamp and controlling said circuit connecting said power source and said security light, said photocell arranged to disconnect said security light by interrupting said circuit thereto upon actuation and rotation of said alarm lamp, and separate means for controlling said circuit in connection with said power source and said rotatable socket assembly and the alarm lamp and said means for imparting rotary movement to said socket assembly and wherein said security light is a mercury vapor type.

2. The security light and alarm device set forth in claim 1 wherein said means for imparting rotary movement to said socket assembly comprises a motor and gear box, a rotatable shaft in said gear box engaging said rotatable socket assembly.

3. The security light and alarm device of claim 1 wherein separate means for controlling said circuit in connection with said power source for energizing said rotatable socket assembly and alarm lamp comprises a solenoid actuated switch, a circuit connecting said solenoid actuated switch and manually operated means for energizing said solenoid operated switch.

4. The security light and alarm device set forth in claim 1 and wherein said housing is cylindrical, the light transmitting extension on its upper end is dome-shaped to form a weather tight enclosure and the light transmitting extension on its lower end comprises an open ended semi-cylindrical lens.

* * * * *